(No Model.) 2 Sheets—Sheet 1.
T. D. FARRALL.
APPARATUS FOR PRODUCING STEAM, HEAT, AND LIGHT BY ELECTRICITY.
No. 423,421. Patented Mar. 18, 1890.
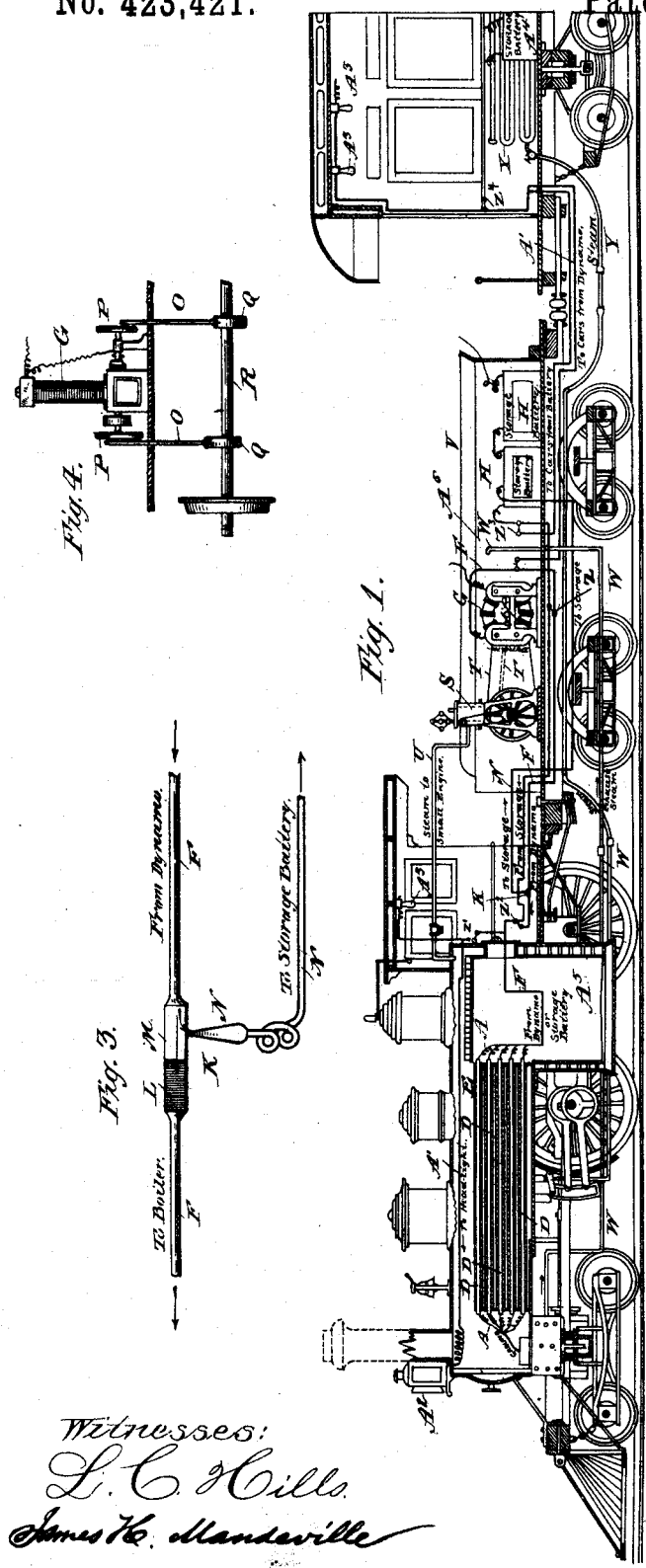
Witnesses:
L. C. Hills.
James H. Mandeville
Inventor:
Theophilus D. Farrall
R. C. Woodward,
Attorney.
N. PETERS, Photo-Lithographer, Washington, D. C.

(No Model.) 2 Sheets—Sheet 2.
T. D. FARRALL.
APPARATUS FOR PRODUCING STEAM, HEAT, AND LIGHT BY ELECTRICITY.
No. 423,421. Patented Mar. 18, 1890.
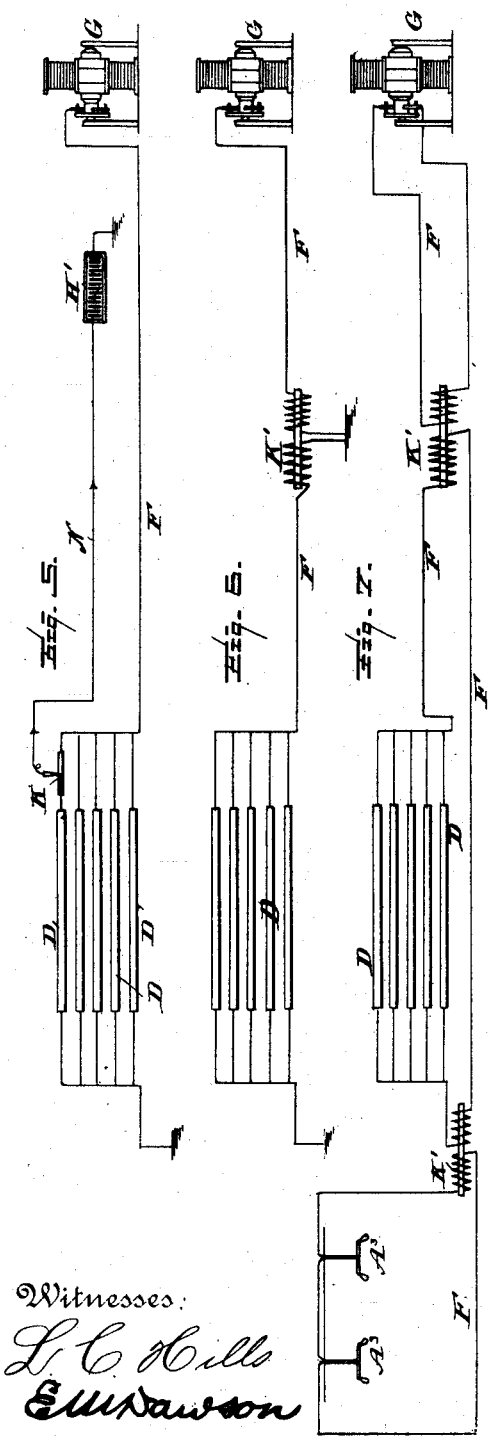
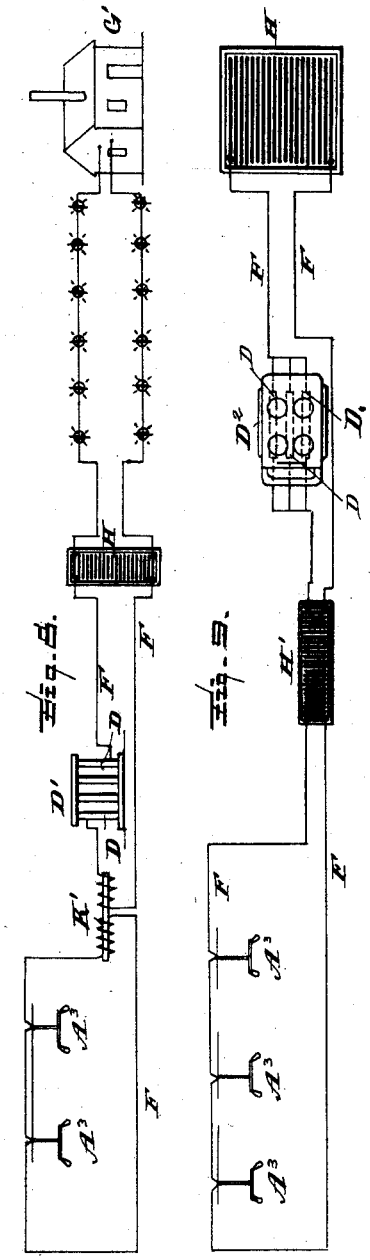
Witnesses:
L. C. Hills
Ellis Dawson
Inventor:
Theophilus D. Farrall
Attorney
T. C. Woodward

UNITED STATES PATENT OFFICE.

THEOPHILUS D. FARRALL, OF MICHIGAN CITY, INDIANA.

APPARATUS FOR PRODUCING STEAM, HEAT, AND LIGHT BY ELECTRICITY.

SPECIFICATION forming part of Letters Patent No. 423,421, dated March 18, 1890.

Application filed October 5, 1889. Serial No. 326,140. (No model.)

*To all whom it may concern:*

Be it known that I, THEOPHILUS D. FARRALL, now of Michigan City, Indiana, United States of America, formerly of London, England, have invented certain new, useful, and important Methods and Mechanism for Generating Heat, Steam, and Light by Electricity' set forth in this specification and the drawings thereof.

My invention consists in practical methods and means for generating heat, steam, and light by electricity, and embodies the combinations of dynamo-electric machines, storage-batteries or accumulators, or other electric-supplying mechanism, electric-heating cartridges, steam-generating boilers, steam-engines, and electric-lighting apparatus, and embraces other mechanism, electric conductors, heating electric conductors, and certain details of construction by which electricity, heat, steam, and light are generated and applied without the use of coals or other fuel for heating, for motive power, and for lighting purposes, and by which surplus power and exhaust-steam and momentum are utilized for the same, and by which heat, steam, and light are generated and applied by electricity from a central plant or plants or other sources of electricity.

My invention is equally applicable to locomotive and stationary and marine engines as well as to buildings, and is useful for other purposes where heat, steam, or light is required. When applied to a locomotive or other engine, no smoke, steam, sparks, or noxious fumes issue therefrom. It does away entirely with the furnace, smoke-stack, and draft-plate or blower, and permits the exhaust-steam to be secured in an exhaust-steam receiver, and used for power or for heating passenger or other cars, and to be returned to the engine-tank or discharged and a portion of the electricity generated to be used for producing electric light. When applied to a stationary engine or marine engine, similar results are obtained, and in the case of a marine engine the storage capacity of the steamship is greatly increased, allowing space previously used for the storage of coals to be utilized for general merchandise.

In the form of constructions shown, Figure 1 is a partially-transverse vertical section of a locomotive, tender, and car, showing my invention applied thereto. Fig. 2 is a transverse vertical section in detail of the insulating electric-heating cartridge broken in places, showing the heating electric conductor in different forms. Fig. 3 is a detail plan view of the electric arrester applied to the electric conductor and electric diverter. Fig. 4 is a detail view of the devices for operating the dynamo-electric machine from an axle. Figs. 5, 6, 7, 8, and 9 are traced electrical circuits designating the principal features of my invention as applied in various ways for heating, generating steam, and lighting purposes.

In my invention I take one or more a plain or coiled or corrugated or other suitable form of wire or ribbon of platinum or other suitable heating electric conductor A and incase it by metal B', asbestus, asbestus paper, or other suitable material B, and put in a filling of asbestus, soapstone, powdered glass, or some other electric non-conducting or other suitable material C, thereby forming an insulating electric-heating cartridge D to extend entirely through or partially through the tubes of a tubular steam-boiler E, or to be applied in any suitable manner when the steam-boiler is not of tubular construction, the heating electric conductor running partially through or entirely through the electric-heating cartridge.

The heating electric conductor may be in cable form or may be a double wire or ribbon returning the electric current through the electric-heating cartridge, adapted to be fastened or connected to another wire F of the same diameter or capacity as the wire F at the other end of the electric-heating cartridge, which carries forward the electric current to the heating electric conductor A.

The heating electric conductor A, whether plain or other forms, may be so inserted as to cause intense heat in one or more places I along the length of the electric-heating cartridge D, by joining at intervals electric conductors of the same size or capacity as the electric conductor F, forming sections I of the heating electric conductor in the electric-heating cartridge D. Intense heat being generated by the heating electric conductor A, which passes through the electric-heating cartridge D, intense heat is given off to the asbestos or soapstone or other electric non-conducting substance of the electric-heating cartridge, and from the electric-heating cartridge to a body to be heated, or to the tubes of a steam-boiler or to a steam-boiler to generate heat and steam.

Asbestos of all known poor conductors of electricity is pre-eminently adapted for the shell B and the non-conducting filling of the electric-heating cartridge, as it is almost indestructible by heat and is a well-known article of commerce, while soapstone also is a poor conductor of electricity and not easily destroyed by heat, and may be used successfully for the purpose.

The ends of the electric-heating cartridge have suitable rings J, or other forms of electric non-conducting material, preferably of soapstone or asbestos, to insulate the projecting ends of the heating electric conductor in the electric-heating cartridge, the projecting ends being carried forward in order to make the connections with the cable, wire, or other electric conductor F and the circuit complete. These electric-heating cartridges may be multiplied indefinitely and be placed within all or any or such tubes of an electric heater or of a steam-boiler as will be sufficient to generate heat or the steam necessary to successfully work an engine or engines to which the steam-boiler is attached or forms a part thereof, or in non-tubular boilers and electric heaters may be placed in any suitable position to obtain the best results.

To obtain and supply electricity to produce sufficient heat to heat an electric heater or to generate steam, electric storage-batteries or accumulators are used of sufficient capacity to produce such electric current or currents as will heat the electric-heating cartridge to a sufficient degree for the purpose, or any source of electricity may be utilized to that end. By an electric arrester K, formed of two or more metals L M of different electrical carrying power, placed in the electric conductor F near the point of contact with the electric-heating cartridge, or in any other suitable position, and by an electric-carrying wire or electric diverter N in contact with one of the metals of the electric arrester, and which only partially diverts the electric current and leads to the storage-battery or accumulator H', the storage-battery or accumulator is supplied with electricity diverted from the electric conductor F.

In the case of a steam boiler and engine I place a suitable dynamo-electric machine or other electric generator to work in any suitable manner, as by pitmen O, cranks P, eccentrics Q on an axle R, or by other mechanism, and this is especially applicable to a stationary or marine engine where the action of the engine is comparatively continuous. I also employ a small supplemental engine S, attached to the boiler, to work the dynamo-electric machine separately by belt or pitman T or other suitable devices when the large engine is or is not in motion or operation, taking sufficient steam from the boiler by suitable connection U, the amount of steam required for the purpose being comparatively small. This small engine is especially applicable in the case of a locomotive, for when the locomotive is not in motion or is running on downgrades the excess of steam generated is utilized for the purpose.

The storage-batteries or accumulators are supplied from outside sources of electricity with electricity whenever necessary, or the empty ones exchanged for filled ones, as desired. The electric currents run from the dynamo-electric machines, storage-batteries, or accumulators, and one or more currents run to the electric-heating cartridges, and any suitable device is used for attaching the electric conductor F or other electric conductor carrying the electric current to the electric-heating cartridges.

When the heating electric conductor in the electric-heating cartridge is destroyed or rendered inoperative from any cause, the electric-heating cartridges when made detachable may be withdrawn and a new one substituted, the tubes of a boiler being generally so constructed as to allow the electric-heating cartridge to be easily changed.

In the case of a locomotive I constitute the tender the receptacle for the dynamo-electric machine and storage-batteries or accumulators and of the small supplemental engine to work the dynamo-electric machine, and no draft being required or smoke produced the smoke-stack is dispensed with and the steam returned to the engine-tank V by any suitable means, as a pipe W, and condensed, warming the water for the boiler. The exhaust-steam not being required for the purpose of creating a draft up the smoke-stack, as is usual in locomotives, it can be utilized for heating the cars by steam-heating appliances X and suitable connections Y, and the steam afterward returned to the engine-tank.

The dynamo-electric machines and storage-batteries or accumulators may be used separately or conjointly by suitable switch mechanism Z, depending upon the amount of heat required either in starting the engine or in an emergency requiring increased power, as running up a heavy grade in the case of a locomotive.

The boiler of an engine can be enlarged to the extent of the space now used as the fire-box without extending the length of the engine, and this or any other suitable part of the boiler can be formed into a separate compartment $A^6$ to receive the exhaust-steam from the cylinders, and the steam utilized to work the supplemental engine running the dynamo-electric machine, or used for heating cars or other heating purposes, or a separate receiver, boiler, or tank $A^5$ can be supplied to the engine or to a tender, or form a part thereof to receive the steam from the cylinders, to be then utilized to work the supplemental engine, or to heat cars, or for other heating purposes, the steam-pressure in the exhaust-steam receiver to be regulated in any suitable manner. A portion of the electric current generated can be carried forward by any suitable electric conductors and electric devices A' to light cars, head-light A² of the engine, signal-lamps, and elsewhere, as desired, by electric lights A³, and in the case of a stationary engine to light the manufactory and grounds, and in the case of a marine engine to light all parts of the ship, and in buildings to light the rooms as desired after heating the heating electric conductors. The asbestos or soapstone in the electric-heating cartridge is of sufficient compactness to prevent any injury from atmospheric influence or from the plasticity of the heating electric conductor when intensely heated.

The dynamo-electric machines, storage-batteries or accumulators, supplemental engine, supplemental boiler, exhaust-steam receiver, and other mechanism in the form of construction shown in the drawings may be placed in any other suitable position on the train, and in other forms of construction may be placed in any manner best adapted for the particular requirement.

My invention may be embodied in other forms of construction and applied to other purposes than those shown to adapt it for generating steam-power and for heating all kinds of structures by the action of direct heat, and in connection therewith for lighting the same by the electricity previously utilized for other purposes, and for application to any, all, and every heater D', stove D², and electric lighters A³, or devices for heating, generating steam, lighting, cooking, or other purposes.

The electric-generating apparatus, in other forms of construction than that shown in the drawings, may consist of a central plant or plants G' in a district for supplying heat to the electric-heating cartridges as applied at various points in a district.

In Fig. 1 an electric conductor F runs from the dynamo-electric machine G and the storage-batteries H, by switch-connection Z, through the heating electric cartridges D to earth, and an electric conductor or diverter N runs from the arrester K to the storage-battery H' (see Fig. 5) and then to earth, and the electric conductor F, by further switch-connection Z', runs to the head-light A² on the locomotive and then to earth, and by further switch-connection Z² runs to the electric lights A³ in the cab of the locomotive and then to earth, and runs from the dynamo-electric machine G and the storage-batteries H, by further switch-connection Z³, to the electric lights A³ in the cars of the train and then to earth; but this part of my invention is more fully shown in Figs. 5, 6, and 7, with the addition of a transformer K' between the dynamo-electric machine G and the heating electric cartridges D, the transformer being for the purpose of changing the character of the electric current from the source of electricity to one best adapted for heating purposes. The electric lights A³ being beyond the electric-heating cartridge, a transformer K' is interposed between the electric heating cartridge and the electric lights to again change the electric currents to sustain or strengthen the volume of the electric current to better adapt it for electric lighting. Fig. 8 also shows an electric-lighting plant G' as the electric generator or source of electricity and the electric conductor F, running from the electric-lighting circuit in connection with a storage-battery H, and then in connection with electric-heating cartridges D in a radiator D', and then in connection with a transformer K' to electric lights A³. Fig. 9 shows the electric conductor F, running from a storage-battery H, as a source of electricity, then to the electric-heating cartridges D in a cooking-stove D², then to a storage-battery H' as an electric storer, then applied to electric lighting.

The electric-heating cartridge may be made with or without a case, and consist of any suitable electric conductor or conductors or any number thereof for evolving heat, insulated and protected by any suitable medium or mediums for receiving, retaining, and transmitting the heat evolved to the substance or thing to be heated.

An electric transformer or transformers K' may be interposed between the electric generator or generators or the source of electricity and the electric-heating cartridge or electric-heating cartridges; or they may be placed in any position, as between the electric heater and the electric-lighting apparatus or wherever required to increase the heating or the lighting power or the volume of the electric current, and any other well-known electric appliances may be used where necessary.

Portable storage-batteries or accumulators A⁴ may be supplied with electricity and placed in a car or otherwise for reserve for any purpose, or they may be filled by an extra dynamo-electric machine or electric generator operated from the axle of cars when in motion, or from some other suitable part of the train, and be connected to the conductor F by switches Z⁴.

I may use any kind of a dynamo-electric machine suitable for any particular requirement in carrying out my invention; but I prefer to use continuous-current dynamo-electric machines with the circuits in which storage-batteries are shown, and I may use either continuous or alternating current dynamo-electric machines in the other circuits shown in the drawings.

By an "electric-heating cartridge," I mean a device consisting of a casing, refractory material therein, and a heating electric conductor for heating the same.

The details of construction and operation and the substances and devices used may be varied within the scope of my invention, and the invention may be applied to other purposes than those named, and the electric current necessary may be obtained from any source of electricity.

I claim as my invention—

1. For heating by electricity, an electric-heating cartridge consisting of the combination of a heating electric conductor incased by suitable refractory material containing a suitable refractory substance.

2. For heating by electricity, an electric-heating cartridge consisting of the combination of a casing, refractory material therein, and a heating electric conductor for heating the same.

3. For heating by electricity, an electric-heating cartridge consisting of the combination of a casing, refractory material therein, and an insulated heating electric conductor for heating the same.

4. For generating heat by electricity, the combination, with a source of electricity and an electric transformer, storage-battery, or accumulator, of an electric-heating cartridge, substantially as described, and an electric heater adapted for conjoint operation, and operative connecting mechanism.

5. For generating heat by electricity, the combination, with a source of electricity, of an electric-heating cartridge, substantially as described, and an electric heater adapted for conjoint operation, and operative connecting mechanism.

6. For generating heat by electricity, the combination of an electric-heating cartridge, substantially as described, and an electric heater adapted for conjoint operation, and operative connecting mechanism.

7. For generating steam by electricity, the combination, with a source of electricity and an electric transformer, storage-battery, or accumulator, of an electric-heating cartridge, substantially as described, and a steam-generator adapted for conjoint operation, and operative connecting mechanism.

8. For generating steam by electricity, the combination, with a source of electricity, of an electric-heating cartridge, substantially as described, and a steam-generator adapted for conjoint operation, and operative connecting mechanism.

9. For generating steam by electricity, the combination of an electric-heating cartridge, substantially as described, and a steam-generator adapted for conjoint operation, and operative connecting mechanism.

10. For operating a steam-engine, the combination, with a source of electricity and an electric transformer, storage-battery, or accumulator, of an electric-heating cartridge, substantially as described, and a steam-generator adapted for conjoint operation, a steam-engine, and operative connecting mechanism.

11. For operating a steam-engine, the combination, with a source of electricity, of an electric-heating cartridge, substantially as described, and a steam-generator adapted for conjoint operation, a steam-engine, and operative connecting mechanism.

12. For operating a steam-engine, the combination of an electric-heating cartridge, substantially as described, and a steam-generator adapted for conjoint operation, a steam-engine, and operative connecting mechanism.

13. For utilizing exhaust-steam, the combination, with a source of electricity and an electric transformer, storage-battery, or accumulator, of an electric-heating cartridge, substantially as described, and a steam-generator adapted for conjoint operation, a steam-engine, an exhaust-steam receiver, a supplemental engine, and operative connecting mechanism.

14. For utilizing exhaust-steam, the combination, with a source of electricity, of an electric-heating cartridge, substantially as described, and a steam-generator adapted for conjoint operation, a steam-engine, an exhaust-steam receiver, a supplemental engine, and operative connecting mechanism.

15. For utilizing exhaust-steam, the combination of an electric-heating cartridge, substantially as described, and a steam-generator adapted for conjoint operation, a steam-engine, an exhaust-steam receiver, and operative connecting mechanism.

16. For operating a dynamo-electric machine, the combination, with a source of electricity and an electric transformer, storage-battery, or accumulator, of an electric-heating cartridge, substantially as described, and a steam-generator adapted for conjoint operation, a steam-engine, a dynamo-electric machine, and operative connecting mechanism.

17. For operating a dynamo-electric machine, the combination, with a source of electricity, of an electric-heating cartridge, substantially as described, and a steam-generator adapted for conjoint operation, a steam-engine, a dynamo-electric machine, and operative connecting mechanism.

18. For diverting electricity, the combination, with a source of electricity and an electric-heating cartridge, substantially as described, of a connecting electric conductor having a section or arrester of metals differing in kinds and in electric conducting capacities from the electric conductor and from one another, and an electric diverter in contact with one of the metals and electrically connected to a storage-battery.

19. For diverting electricity, the combination of an electric conductor having a section or arrester of metals differing in kinds and in electric conducting capacities from the electric conductor and from one another, and an electric diverter in contact with one of the metals and electrically connected to a storage-battery.

20. For diverting electricity, the combination of an electric section or arrester of metals differing in kinds and in electric conducting capacities, and an electric diverter in contact with one of the metals.

21. For generating heat and light by electricity, the combination, with a source of electricity and an electric transformer, storage-battery, or accumulator, of an electric-heating cartridge, substantially as described, and electric-lighting apparatus with an intermediate transformer, storage-battery, or accumulator electrically connected, and operative connecting mechanism.

22. For generating heat and light by electricity, the combination, with a source of electricity, of an electric-heating cartridge, substantially as described, and electric-lighting apparatus with an intermediate transformer, storage-battery, or accumulator electrically connected, and operative connecting mechanism.

23. For generating heat and light by electricity, the combination of an electric-heating cartridge, substantially as described, and electric-lighting apparatus with an intermediate transformer, storage-battery, or accumulator electrically connected, and operative connecting mechanism.

24. For generating heat, steam, and light by electricity, the combination, with a source of electricity and an electric transformer, storage-battery, or accumulator, of an electric-heating cartridge, substantially as described, and a steam-generator adapted for conjoint operation, electric-lighting apparatus electrically connected, and operative connecting mechanism.

25. For generating heat, steam, and light by electricity, the combination, with a source of electricity, of an electric-heating cartridge, substantially as described, and a steam-generator adapted for conjoint operation, electric-lighting apparatus electrically connected, and operative connecting mechanism.

26. For generating heat, steam, and light by electricity, the combination of an electric-heating cartridge, substantially as described, and a steam-generator adapted for conjoint operation, electric-lighting apparatus electrically connected, and operative connecting mechanism.

In testimony whereof I hereunto subscribe my signature and affix my seal in the presence of two witnesses, in Michigan City, county of La Porte, State of Indiana, the 9th day of October, 1886.

THEOPHILUS D. FARRALL. [L. S.]

Witnesses:
JAMES S. HOPPER,
HARVEY R. HARRIS.